US012308540B2

(12) United States Patent
Sagawa

(10) Patent No.: US 12,308,540 B2
(45) Date of Patent: May 20, 2025

(54) WIRE-TO-CIRCUIT BOARD CONNECTION STRUCTURE AND A CIRCUIT BOARD-ATTACHED CABLE

(71) Applicant: Hitachi Metals, Ltd., Tokyo (JP)

(72) Inventor: Masanori Sagawa, Tokyo (JP)

(73) Assignee: Proterial, Ltd., Tokyo (JP)

( * ) Notice: Subject to any disclaimer, the term of this patent is extended or adjusted under 35 U.S.C. 154(b) by 321 days.

(21) Appl. No.: 17/881,031

(22) Filed: Aug. 4, 2022

(65) Prior Publication Data

US 2023/0040942 A1 Feb. 9, 2023

(30) Foreign Application Priority Data

Aug. 6, 2021 (JP) ................................ 2021-129784

(51) Int. Cl.
*H01R 12/70* (2011.01)
*H01R 12/75* (2011.01)

(52) U.S. Cl.
CPC ......... *H01R 12/7005* (2013.01); *H01R 12/75* (2013.01)

(58) Field of Classification Search
CPC ............................ H01R 12/7005; H01R 12/75
USPC ............................................ 439/77, 82, 493
See application file for complete search history.

(56) References Cited

U.S. PATENT DOCUMENTS 4,735,582 A 4/1988 Fusselman et al.
4,955,814 A * 9/1990 Christie ................ H01R 12/53 439/493
5,186,638 A * 2/1993 Pusch .................... H01R 12/79 29/842
10,312,609 B2 6/2019 Kawate
2018/0261936 A1 9/2018 Kawate

FOREIGN PATENT DOCUMENTS

| | | |
|---|---|---|
| JP | S56-176475 U | 12/1981 |
| JP | S59-002077 U | 1/1984 |
| JP | S63-141275 A | 6/1988 |
| JP | 11-233910 A | 8/1999 |
| JP | 2005-322817 A | 11/2005 |
| JP | 2018-516442 A | 6/2018 |

OTHER PUBLICATIONS

"Notice of Reasons for Refusal" Office Action issued in JP 2021-129784; mailed by the Japanese Patent Office on Feb. 18, 2025.

* cited by examiner

*Primary Examiner* — Phuong K Dinh
(74) *Attorney, Agent, or Firm* — Studebaker Brackett PLLC

(57) ABSTRACT

A wire-to-circuit board connection structure between wires including conductive cores, respectively covered with insulative coatings, and a circuit board to which the respective cores of the wires are connected, is provided with a guide member attached to the circuit board. The guide member includes guide holes into which the respective cores of the wires are inserted. The circuit board includes through-holes into which the respective cores of the wires passed through the guide holes are inserted. The guide holes include tapered holes configured in such a manner that each inner diameter is reduced as being closer to the circuit board. A circuit board-attached cable is composed of a cable including the wires, the circuit board, and the guide member.

6 Claims, 5 Drawing Sheets

WIRE-TO-CIRCUIT BOARD CONNECTION STRUCTURE AND A CIRCUIT BOARD-ATTACHED CABLE

CROSS-REFERENCE TO RELATED APPLICATION

The present patent application claims the priority of Japanese patent application No. 2021-129784 filed on Aug. 6, 2021, and the entire contents thereof are hereby incorporated by reference.

TECHNICAL FIELD

The present invention relates to a wire-to-circuit board connection structure and a circuit board-attached cable.

BACKGROUND

Conventionally, a structure for connecting an electrical cable including multiple electric wires (i.e., wires) to a circuit board has been known, e.g., as described in Patent Literature 1, Patent Literature 1 describes that an electrical cable is connected to a circuit board via an insulated housing and a connector with multiple terminals. One end of each terminal is connected to a lead wire of the electrical cable and the other end of each terminal is inserted into a conductive via provided on the circuit board, A tip end of the terminal at a portion to be inserted into the conductive via is formed in a tapered shape to facilitate insertion into the conductive via.

In addition, in order to make it easier to insert lead terminals of an electronic component into through-holes of a circuit board, a part or all of the through-holes are formed in the shape of tapered holes, as described in the Patent Literatures 2 and 3.

CITATION LIST

Patent Literature

Patent Literature 1: JP2018-516442A
Patent Literature 2: JP2005-322817A
Patent Literature 3: JPH11-233910A

SUMMARY OF THE INVENTION

As described in Patent Literature 1, the electrical connection of multiple wires to a circuit board using a connector with multiple terminals has drawbacks such as difficulty in connecting the multiple wires directly to the circuit board, which needs time and effort. In other words, the ability to easily connect multiple wires to a circuit board without the use of multiple terminals contributes to lower costs and improves reliability.

Therefore, the object of the present invention is to provide a wire-to-circuit board connection structure between multiple wires and a circuit board that can easily connect the multiple wires to the circuit board and a circuit board-attached cable using this connection structure.

To solve the problems above, one aspect of the present invention provides a wire-to-circuit board connection structure between wires including conductive cores, respectively covered with insulative coatings, and a circuit board to which the respective cores of the wires are connected, comprising:

a guide member attached to the circuit board, the guide member including guide holes into which the respective cores of the wires are inserted, wherein the circuit board includes through-holes into which the respective cores of the wires passed through the guide holes are inserted, and wherein the guide holes include tapered holes configured in such a manner that each inner diameter is reduced as being closer to the circuit board.

Further, to solve the problems above, one aspect of the present invention provides a circuit board-attached cable, comprising:

wires including conductive cores respectively covered with insulative coatings;

a circuit board to which the respective cores of the wires are connected; and a guide member attached to the circuit board, the guide member including guide holes into which the respective cores of the wires are inserted, wherein the circuit board includes through-holes into which the respective cores of the wires passed through the guide holes are inserted, and wherein the guide holes include tapered holes configured in such a manner that each inner diameter is reduced as being closer to the circuit board.

Effects of the Invention

According to the wire-to-circuit board connection structure between the multiple wires and the circuit board and the circuit board-attached cable according to the present invention, it is possible to connect the multiple wires to the circuit board easily.

BEST MODE FOR CARRYING OUT THE INVENTION

Embodiment

Figure 1:
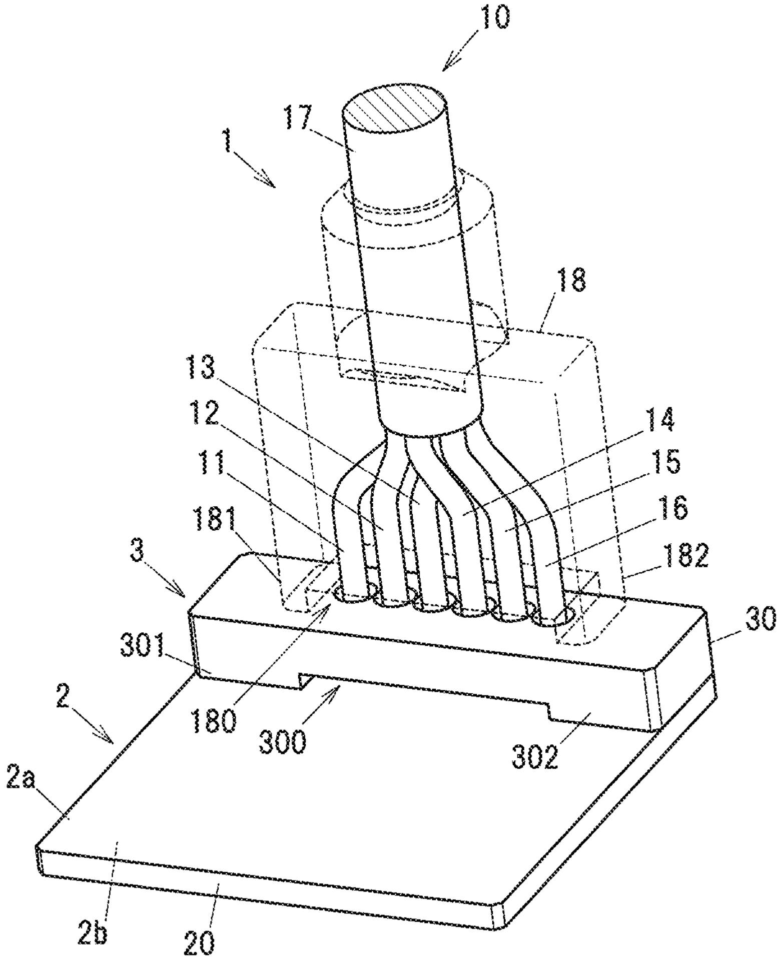
FIG. 1 is a configuration diagram showing a circuit board-attached cable according to an embodiment of the present invention.
Figure 2:
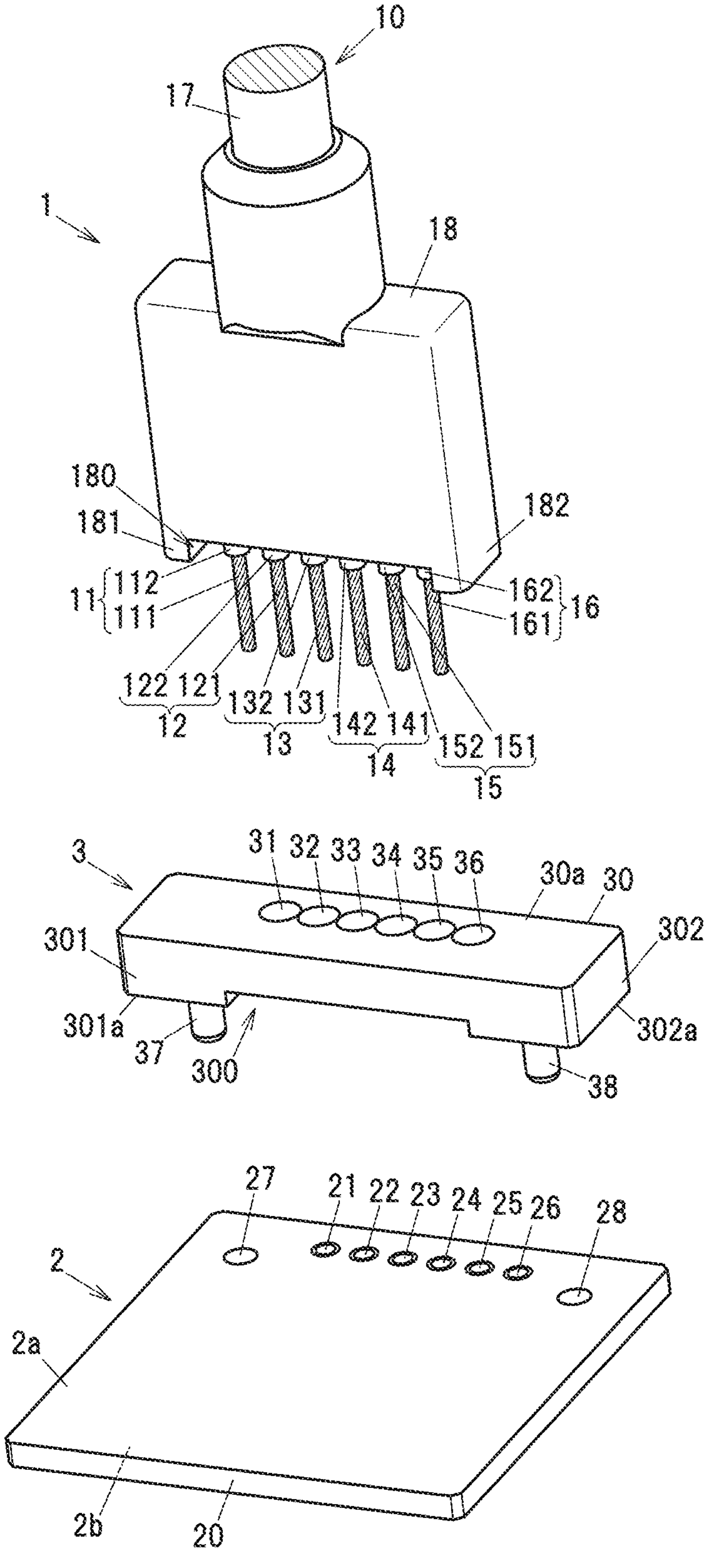
FIG. 2 is a configuration diagram showing each component of the circuit board-attached cable.
Figure 3:
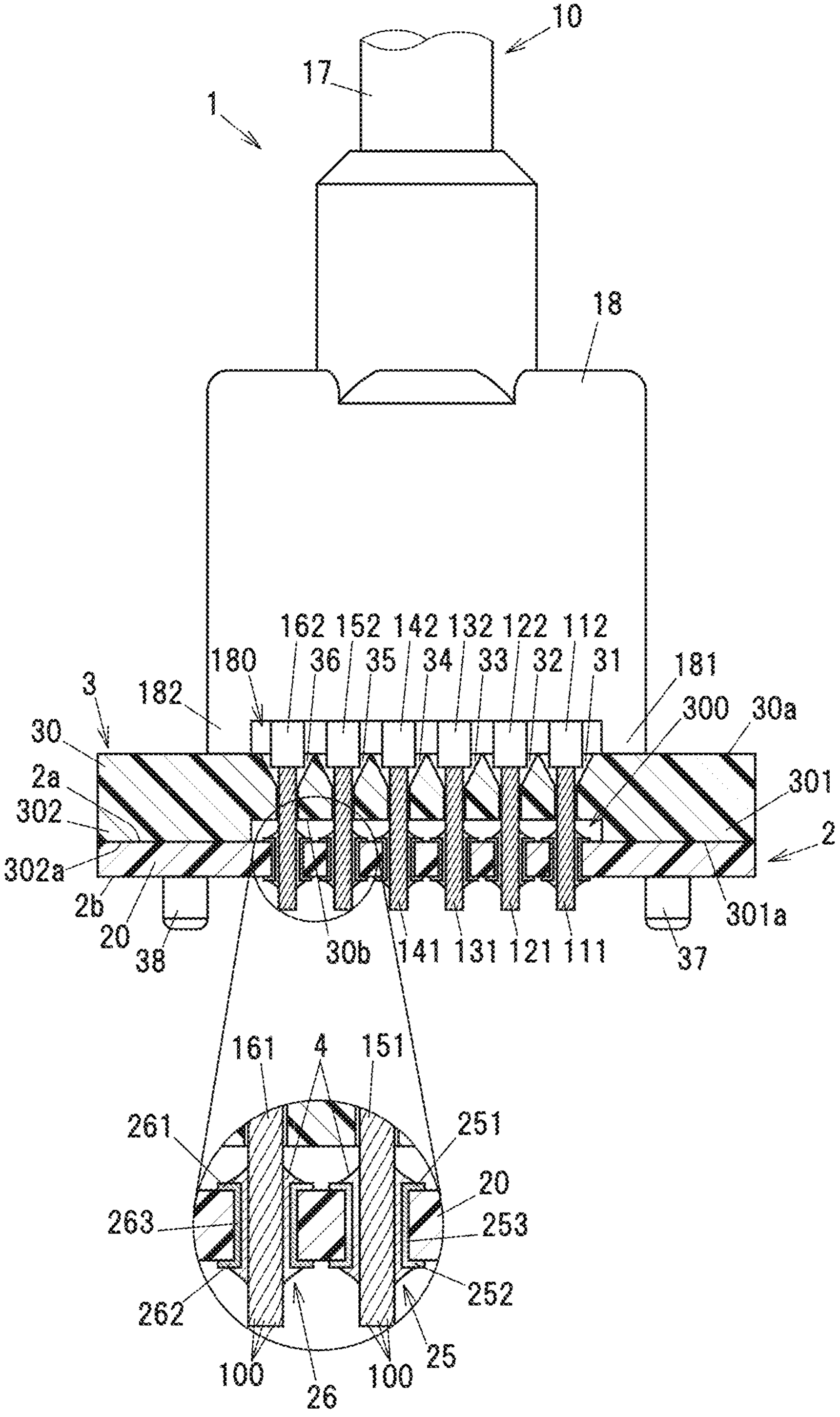
FIG. 3 is a partial cross-sectional view showing a section of the circuit board-attached cable.
Figure 4:
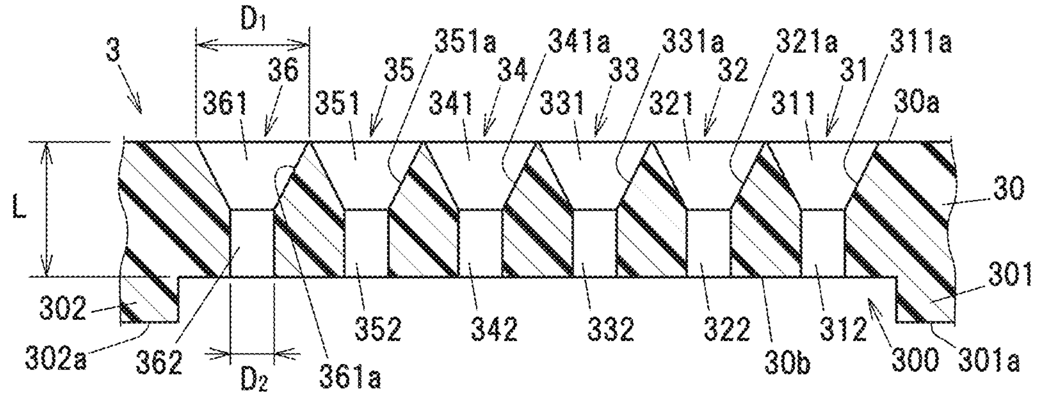
FIG. 4 is a cross-sectional view of a guide member.
Figure 5:
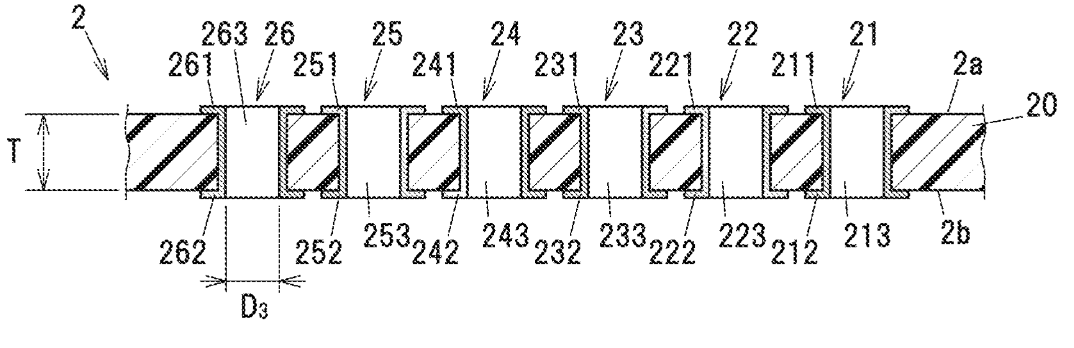
FIG. 5 is a cross-sectional view of the circuit board.
Figure 6A:
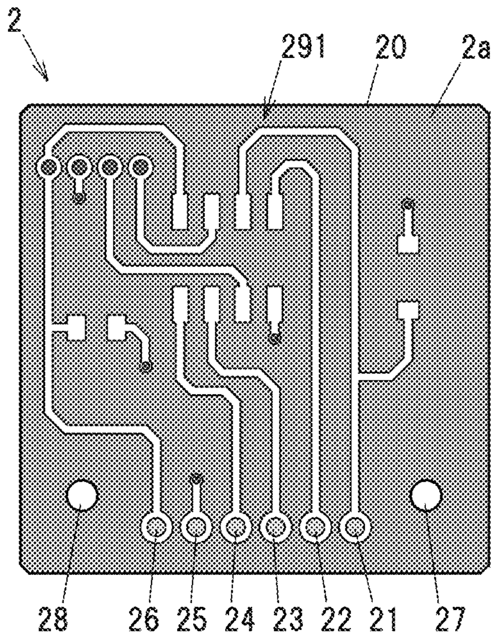
FIG. 6A is a plan view of the front surface of the circuit board.
Figure 6B:
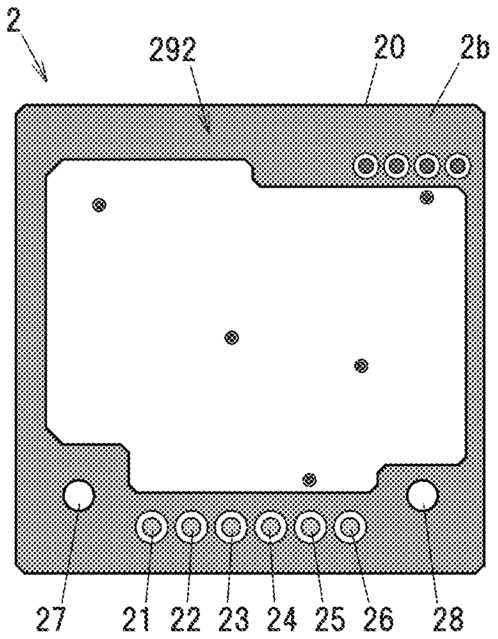
FIG. 6B is a plan view of the back surface of the circuit board.

FIG. 1 is a configuration diagram showing a circuit board-attached cable according to an embodiment of the present invention. FIG. 2 is a configuration diagram showing each component of the circuit board-attached cable. FIG. 3 is a partial cross-sectional view showing a section of the circuit board-attached cable. FIG. 4 is a cross-sectional view of a guide member. FIG. 5 is a cross-sectional view of the circuit board. FIG. 6A is a plan view of the front surface of the circuit board. FIG. 6B is a plan view of the back surface of the circuit board.

A circuit board-attached cable 1 (i.e., a cable with circuit board 1) includes a cable 10 including first to sixth wires (i.e., electric wires) 11 to 16, a circuit board 2 connected to the first to sixth wires 11 to 16, and a guide member 3 attached to the circuit board 2. The first to sixth wires 11 to 16 are insulated electric wires whose electrically conductive cores core wires) 111, 121, 131, 141, 151, and 161 are coated with insulative coatings (i.e., electrically insulative coatings) 112, 122, 132, 142, 152, and 162, respectively, as shown in FIG. 2. The cores 111, 121, 131, 141, 151, and 161 are twisted wires, in each of which multiple strands (i.e., elementary wires) 100 (see FIG. 3) are twisted. The strand 100 is composed of, e.g., a copper alloy or an aluminum alloy.

The cable 10 includes a sheath 17, which covers the first to sixth wires 11 to 16 together (i.e., collectively), and a holder 18, which holds an end of the sheath 17 together with portions of the first to sixth wires 11 to 16. In FIG. 1, an outline of the holder 18 is shown with chain double-dashed lines, and the first to sixth wires 11 to 16 inside the holder 18 are shown with solid lines. The first to sixth wires 11 to 16 are led from the holder 18 toward the guide member 3. In the present embodiment, the holder 18 is a resin mold body. However, the holder 18 may be made of plural members composed of, e.g., metal or resin.

The first to sixth wires 11 to 16 are led from the holder 18 in the state where the cores 111, 121, 131, 141, 151, and 161 of the first to sixth wires 11 to 16 are covered by the insulative coatings 112, 122, 132, 142, 152, and 162, respectively. The insulative coatings 112, 122, 132, 142, 152, and 162 are colored in different colors (including colorless ones). For example, the insulative coating 112 of the first wire 11 is blue, the insulative coating 122 of the second wire 12 is green, the insulative coating 132 of the third wire 13 is white, the insulative coating 142 of the fourth wire 14 is red, the insulative coating 152 of the fifth wire 15 is black, and the insulative coating 162 of the sixth wire 16 is yellow.

The circuit board 2 is a solid board having a plate-like substrate 20 made of an insulating resin, e.g., glass epoxy. The first to sixth cores 111, 121, 131, 141, 151, and 161 of the first to sixth wires 11 to 16 are connected directly to the circuit board 2 by soldering. The circuit board 2 is formed with the first to sixth through-holes 21 to 26, to which the first to sixth cores 111, 121, 131, 141, 151, and 161 of the first to sixth wires 11 to 16 are inserted. The first to sixth through-holes 21 to 26 are through-holes penetrating from the front surface 2*a* to the back surface 2*b* of the circuit board 2.

As shown in FIG. 5, the first to sixth through-holes 21 to 26 have first lands 211, 221, 231, 241, 251, and 261 on the side of the front surface 2*a*, second lands 212, 222, 232, 242, 252, and 262 on the side of the back surface 2*b*, and tubular conductors 213, 223, 233, 243, 253, and 263 for connecting between the first lands on the front surface 2*a*-side and the second lands on the back surface 2*b*-side, respectively. The tubular conductors 213, 223, 233, 243, 253, and 263 are formed by plating inner surfaces of respective holes provided at the substrate 20. In the present embodiment, the first to sixth through-holes 21 to 26 are arranged in a row along an edge of the circuit board 2. However, the present invention is not limited thereto. The multiple through-holes may be provided, e.g., in a staggered shape, or located in a center of the circuit board.

The front surface 2*a* of the circuit board 2 is a mounting surface where electronic components such as a physical quantity sensor that detects physical quantities, such as field strength or temperature, and communication ICs are mounted. FIG. 6A shows an example of a first wiring pattern 291 connecting the terminals of the electronic components to the first to sixth through-holes 21 to 26. A second wiring pattern 292 on the back surface 2*b* of the circuit board 2, as shown in FIG. 6B, is composed primarily of an electrically grounded ground pattern. However, the electronic components to be mounted on the circuit board 2, the wiring patterns on the front surface 2*a* and the back surface 2*b*, and the size and shape of the circuit board 2 are designed accordingly, depending on the application and function of the circuit board-attached cable 1.

The guide member 3, for example, includes an injection-molded non-conductive resin, which has a rectangular-shaped guide member main body 30, and first and second retaining (i.e., fixing) protrusions 37 and 38 for securing the guide member main body 30 to the circuit board 2, integrally (e.g., as one piece). The guide member main body 30 has first to sixth guide holes 31 to 36, to which the cores 111, 121, 131, 141, 151, and 161 of the first to sixth wires 11 to 16 are inserted, respectively. The circuit board 2 is formed with a first fitting hole 27, into which the first retaining protrusion 37 is fitted, and a second fitting hole 28, into which the second retaining protrusion 38 is fitted.

The guide member main body 30 has a pair of legs 301 and 302 at both ends in a longitudinal direction. The tip end surfaces 301*a* and 302*a* of the legs 301 and 302 abut the front surface 2*a* of the circuit board 2. The first and second retaining protrusions 37 and 38 are erected (i.e., stand) perpendicular to the tip end surfaces 301*a*, and 302*a* of the pair of legs 301 and 302, respectively. Also, the guide member main body 30 has a recess 300, which is recessed perpendicular to the front surface 2*a* of the circuit board 2, between the pair of legs 301 and 302.

The first to sixth guide holes 31 to 36 are formed by penetrating between a top surface 30*a*, which is a surface facing to the holder 18, and a bottom surface 30*b*, which is a surface facing to the circuit board 2, along a direction perpendicular to the circuit board 2. The top surface 30*a* is an open-end surface on the side of the holder 18 for the first to sixth guide holes 31 to 36. The bottom surface 30*b* is an inner surface of the recess 300 and an open-end surface on the side of the circuit board 2 for the first to sixth guide holes 31 to 36. Between the bottom surface 30*b* and the front surface 2*a* of the circuit board 2, a gap (e.g., a vacant space) is formed for preventing contact between the solder 4 and the guide member main body 30, as described below.

The holder 18 has a pair of legs 181 and 182, which abut the top surface 30*a* of the guide member main body 30. The first to sixth wires 11 to 16 are led from the pair of legs 181 and 182. Between the holder 18 and the guide member 3, a window section 180 through which the insulative coatings 112, 122, 132, 142, 152, and 162 of the first to sixth wires 11 to 16 can be visually observed. As mentioned above, the insulative coatings 112, 122, 132, 142, 152, and 162 are colored in different colors, so it is possible to detect miswiring by viewing the insulative coatings 112, 122, 132, 142, 152, and 162 from the window section 180.

As shown in FIG. 4, the first to sixth guide holes 31 to 36 have partially conical tapered holes 311, 321, 331, 341, 351, and 361, and cylindrical holes 312, 322, 332, 342, 352, and 362, each of which has a constant inner diameter. The Tapered holes 311, 321, 331, 341, 351, and 361 are located on the side of the top surface 30*a* of the guide member main body 30, The cylindrical holes 312, 322, 332, 342, 352, and 362 are located closer to the side of the bottom surface 30*b* (i.e., the side of the circuit board 2) of the guide member main body 30 than the tapered holes 311, 321, 331, 341, 351, and 361.

The cores 111, 121, 131, 141, 151, and 161 of the first to sixth wires 11 to 16, respectively, are inserted from the top surface 30*a* side of the guide member main body 30 into the tapered holes 311, 321, 331, 341, 351, and 361, penetrate the first to sixth guide holes 31 to 36 through the cylindrical holes 312, 322, 332, 342, 352, and 362, and inserted into the first to sixth through-holes 21 to 26 of the circuit board 2. The tip of the cores 111, 121, 131, 141, 151, and 161 protrude from the back surface 2*b* of the circuit board 2.

As shown in FIG. 3, the cores 111, 121, 131, 141, 151, and 161 inserted into the first to sixth through-holes 21 to 26 are connected by the solder to the first lands 211, 221, 231, 241, 251, and 261 on the side of the front surface 2*a* of the circuit board 2, the tubular conductors 213, 223, 233, 243, 253, and 263, and the second lands 212, 222, 232, 242, 252, and 262 on the side of the back surface 2*b* of the first to sixth through-holes 21 to 26. As mentioned above, the gap (e.g., a vacant space) is formed between the bottom surface 30*b* of the guide member main body 30 and the front surface 2*a* of the circuit board 2. Therefore, an appropriate amount of the solder 4 is also supplied to the first lands 211, 221, 231, 241, 251, and 261 on the front surface 2*a* of the circuit board 2.

The tapered holes 311, 321, 331, 341, 351, and 361 of the guide holes 31 to 36 are configured in such a manner that each inner diameter is reduced as being closer to the bottom surface 30*b* (the circuit board 2). A maximum inner diameter $D_1$ (see FIG. 4) of each of the tapered holes 311, 321, 331, 341, 351, and 361 is larger than an outer diameter of each of the insulative coatings 112, 122, 132, 142, 152, and 162 of the first to sixth wires 11 to 16, respectively. A minimum inner diameter of each of the tapered holes 311, 321, 331, 341, 351, and 361 is smaller than a minimum inner diameter $D_2$ of each of the insulative coatings 112, 122, 132, 142, 152, and 162, and slightly larger than an outer diameter of each of the cores 111, 121, 131, 141, 151, and 161.

The cylindrical holes 312, 322, 332, 342, 352, and 362 of the guide holes 31 to 36 are configured in such a manner that each inner diameter is equal to the minimum inner diameter $D_2$ of each of the tapered holes 311, 321, 331, 341, 351, and 361. The cylindrical holes 312, 322, 332, 342, 352, and 362 of the guide holes 31 to 36 are configured in such a manner that each inner diameter (the minimum inner diameter $D_2$) is smaller than an inner diameter $D_3$ (see FIG. 5) of each of the first to sixth through-holes 21 to 26. A length L of each of the first to sixth guide holes 31 to 36 is longer than a thickness T of the circuit board 2.

Functions and Effects of the Embodiment

The embodiment can achieve the following functions and effects as described above.

Since the first to sixth guide holes 31 to 36 have the tapered holes 311, 321, 331, 341, 351, and 361, the cores 111, 121, 131, 141, 151, and 161 of the first to sixth wires 11 to 16 are guided to the inner surfaces 311*a*, 321*a*, 331*a*, 341*a*, 351*a*, and 361*a* of the tapered holes 311, 321, 331, 341, 351, and 361, so that the respective strands 100 of the cores 111, 121, 131, 141, 151, and 161 can be easily inserted into the first to sixth through-holes 21 to 26 of the circuit board 2.

The length L of each of the first to sixth guide holes 31 to 36 is longer than the thickness T of the circuit board 2. Therefore, it is possible to support the cores 111, 121, 131, 141, 151, and 161 over longer distances and to increase the maximum inner diameter $D_1$ of each of the tapered holes 311, 321, 331, 341, 351, and 361, as compared with the case where, for example, a part or all of the first to sixth through-holes 21 to 26 are formed in a tapered hole shape.

Because of the dimensional relationship that the maximum inner diameter $D_1$ of each of the tapered holes 311, 321, 331, 341, 351, and 361 is larger than the outer diameter of each of the insulative coatings 112, 122, 132, 142, 152, and 162, and that the minimum inner diameter $D_2$ of each of the tapered holes 311, 321, 331, 341, 351, and 361 is smaller than the outer diameter of each of the insulative coatings 112, 122, 132, 142, 152, and 162 and the inner diameter $D_3$ of each of the first to sixth through-holes 21 to 26, the guide function of the tapered holes 311, 321, 331, 341, 351, and 361 for the cores 111, 121, 131, 141, 151, and 161 is enhanced, and the cores 111, 121, 131, 141, 151, and 161 can be inserted smoothly into the first to sixth through-holes 21 to 26 of the circuit board 2.

Since the first to sixth guide holes 31 to 36 have the cylindrical holes 312, 322, 332, 342, 352, and 362, the cores 111, 121, 131, 141, 151, and 161 can be led out toward the circuit board 2 to be parallel to each other.

Since the holder 18 holds the end of the sheath 17 together with the portions of the first to sixth wires 11 to 16, the first to sixth wires 11 to 16 cannot be bent largely in the portions led from the sheath 17, and the first to sixth wires 11 to 16 can be inserted together into the first to sixth guide holes 31 to 36 easily.

Since the insulative coatings 112, 122, 132, 142, 152, and 162 can be visually observed from the window section 180, it is possible to detect miswiring easily. Since the gap is formed between the bottom surface 30*b* of the guide member main body 30 and the front surface 2*a* of the circuit board 2, an appropriate amount of the solder 4 is supplied to the first lands 211, 221, 231, 241, 251, and 261 on the front surface 2*a* of the circuit board 2, so that soldering, of the cores 111, 121, 131, 141, 151, and 161 is assured.

SUMMARY OF THE EMBODIMENTS

Next, the technical ideas grasped from the embodiments will be described with the aid of the reference characters and the like in the embodiments. It should be noted, however, that each of the reference characters and the like in the following descriptions is not to be construed as limiting the constituent elements in the appended claims to the members and the like shown explicitly in the embodiments.

According to the feature [1], a wire-to-circuit board connection structure between wires 11 to 16, including conductive cores 111, 121, 131, 141, 151, and 161, respectively covered with insulative coatings 112, 122, 132, 142, 152, and 162 and a circuit board 2 to which the respective cores 111, 121, 131, 141, 151, and 161 of the wires 11 to 16 are connected, is provided with a guide member 3 attached to the circuit board 2, the guide member 3 being provided with guide holes 31 to 36 into which the respective cores 111, 121, 131, 141, 151, and 161 of the wires 11 to 16 are inserted, wherein the circuit board 2 has through-holes 21 to 26 into which the respective cores 111, 121, 131, 141, 151, and 161 of the wires 11 to 16 passed through the guide holes 31 to 36 are inserted, and wherein the guide holes 31 to 36 include tapered holes 311, 321, 331, 341, 351, and 361 configured in such a manner that each inner diameter is reduced as being closer to the circuit board 2.

According to the feature [2], in the wire-to-circuit board connection structure described in the feature [1], a length L of each of the guide holes 31 to 36 is greater than a thickness T of the circuit board 2.

According to the feature [3], in the wire-to-circuit board connection structure described in the feature [1] or [2], a maximum inner diameter D of each of the tapered holes 311, 321, 331, 341, 351, and 361 is larger than an outer diameter of each of the insulative coatings 112, 122, 132, 142, 152, and 162, and a minimum inner diameter $D_2$ of each of the tapered holes 311, 321, 331, 341, 351, and 361 is smaller than an outer diameter of each of the insulative coatings 112, 122, 132, 142, 152, and 162 and an inner diameter $D_3$ of each of the through-holes 21 to 26.

According to the feature [4], in the wire-to-circuit board connection structure described in any one of the features [1] to [3], the guide holes 31 to 36 include cylindrical holes 312, 322, 332, 342, 352, and 362 which are located closer to the circuit board 2 than the tapered holes 311, 321, 331, 341, 351, and 361, and wherein the cylindrical holes 312, 322, 332, 342, 352, and 362 are configured in such a manner that each inner diameter is equal to a minimum inner diameter $D_2$ of each of the tapered holes 311, 321, 331, 341, 351, and 361 on a side of the circuit board 2.

According to the feature [5], the wire-to-circuit board connection structure described in any one of the features [1] to [4], further includes a sheath 17 covering the wires 11 to 16 collectively, wherein an end of the sheath 17 is held by a holder 18 together with portions of the respective wires 11 to 16, and the wires 11 to 16 are led from the holder 18.

According to the feature [6], in the wire-to-circuit board connection structure described in the feature [5], the cores 111, 121, 131, 141, 151, and 161 of wires 11 to 16 are led from the holder 18 in the state where the cores 111, 121, 131, 141, 151, and 161 are covered by the insulative coatings 112, 122, 132, 142, 152, and 162, respectively, and a window section 180, through which the insulative coatings 112, 122, 132, 142, 152, and 162 can be visually observed, is provided between the holder 18 and the guide member 3.

According to the feature [7], in the wire-to-circuit board connection structure described in any one of the features [1] to [7], a gap is provided between the circuit board 2 and an open-end surface 30*b* for the guide holes 31 to 36 in the guide member 3 on a side of the circuit board 2.

According to the feature [8], a circuit board-attached cable 1 is composed of wires 11 to 16 including conductive cores 111, 121, 131, 141, 151, and 161 respectively covered with insulative coatings 112, 122, 132, 142, 152, and 162, a circuit board 2 to which the respective cores 111, 121, 131, 141, 151, and 161 of the wires 11 to 16 are connected, and a guide member 3 attached to the circuit board 2, the guide member 3 being provided with guide holes 31 to 36 into which the respective cores 111, 121, 131, 141, 151, and 161 of the wires 11 to 16 are inserted, wherein the circuit board 2 has through-holes 21 to 26 into which the respective cores 111, 121, 131, 141, 151, and 161 of the wires 11 to 16 passed through the guide holes 31 to 36 are inserted, and wherein the guide holes 31 to 36 include tapered holes 311, 321, 331, 341, 351, and 361 configured in such a manner that each inner diameter is reduced as being closer to the circuit board 2.

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

The invention claimed is:

1. A wire-to-circuit board connection structure between wires including conductive cores, respectively covered with insulative coatings, and a circuit board to which the respective cores of the wires are connected, comprising:

a guide member attached to the circuit board, the guide member including guide holes into which the respective cores of the wires are inserted, a sheath covering the wires collectively, wherein an end of the sheath is held by a holder together with portions of the respective wires, and the wires are led from the holder, wherein the circuit board includes through-holes into which the respective cores of the wires passed through the guide holes are inserted, wherein the guide holes include tapered holes configured in such a manner that each inner diameter is reduced as being closer to the circuit board, and wherein the cores of the wires are led from the holder in a state where the cores are covered by the insulative coatings, respectively, and a window section, through which the insulative coatings can be visually observed, is provided between the holder and the guide member.

2. The wire-to-circuit board connection structure according to claim 1, wherein a length of each of the guide holes is greater than a thickness of the circuit board.

3. The wire-to-circuit board connection structure according to claim 1, wherein a maximum inner diameter of each of the tapered holes is larger than an outer diameter of each of the insulative coatings, and a minimum inner diameter of each of the tapered holes is smaller than an outer diameter of each of the insulative coatings and an inner diameter of each of through holes.

4. The wire-to-circuit board connection structure according to claim 1, wherein the guide holes include cylindrical holes, which are located closer to the circuit board than the tapered holes, and wherein the cylindrical holes are configured in such a manner that each inner diameter is equal to a minimum inner diameter of each of the tapered holes on a side of the circuit hoard.

5. The wire-to-circuit board connection structure according to claim 1, wherein a gap is provided between the circuit board and an open-end surface for the guide holes in the guide member on a side of the circuit board.

6. A circuit board-attached cable, comprising:

wires including conductive cores respectively covered with insulative coatings;

a circuit board to which the respective cores of the wires are connected;

a guide member attached to the circuit board, the guide member including guide holes into which the respective cores of the wires are inserted, and a sheath covering the wires collectively, wherein an end of the sheath is held by a holder together with portions of the respective wires, and the wires are led from the holder, wherein the circuit board includes through-holes into which the respective cores of the wires passed through the guide holes are inserted, and wherein the guide holes include tapered holes configured in such a manner that each inner diameter is reduced as being closer to the circuit board, and wherein the cores of the wires are led from the holder in a state where the cores are covered by the insulative coatings, respectively, and a window section, through which the insulative coatings can be visually observed, is provided between the holder and the guide member.

* * * * *